United States Patent [19]

Omori et al.

[11] Patent Number: 4,925,563
[45] Date of Patent: May 15, 1990

[54] LIQUID WASTE PROCESSING APPARATUS

[75] Inventors: Hidetoshi Omori, Okazaki; Akira Shoji, Nagoya; Hiroshi Akaza, Toyota, all of Japan

[73] Assignee: Trinity Industrial Corporation, Tokyo, Japan

[21] Appl. No.: 283,133

[22] Filed: Dec. 12, 1988

[30] Foreign Application Priority Data

Jun. 30, 1988 [JP] Japan .................................. 63-85833

[51] Int. Cl.$^5$ ............................................. B01D 21/00
[52] U.S. Cl. .................................................. 210/532.1
[58] Field of Search ............... 210/801, 802, 519, 521, 210/522, 532.1, 536, 538, 540

[56] References Cited

U.S. PATENT DOCUMENTS 4,400,280  8/1983  Larsson et al. ..................... 210/521

FOREIGN PATENT DOCUMENTS 60-14666  9/1985  Japan .
61-308398 12/1986  Japan .

Primary Examiner—Ivars Cintins
Attorney, Agent, or Firm—Cushman, Darby & Cushman

[57] ABSTRACT

A liquid waste processing apparatus having a liquid waste processing vessel for separating and recovering floating sludges. The liquid waste processing vessel includes an inlet disposed on its one side wall for receiving liquid wastes from above and turning them toward an exit disposed on the other side wall of the vessel, slanted downwardly toward the one side wall, and an inclined plate disposed above the exit for forming a shallow portion below the liquid surface and extended along the inclination of the opposite side wall toward the one side wall to define a narrow flow channel between the plate and the opposite side wall which is in communication from the bottom to the exit. The cross-sectional area of the narrow flow channel is made smaller than that of the channel opening. Floating sludges and precipitating sludges contained in liquid wastes from a coating booth, etc. can be separated and recovered completely and easily.

1 Claim, 1 Drawing Sheet

LIQUID WASTE PROCESSING APPARATUS

BACKGROUND OF THE INVENTION

1. Field of the Invention

The present invention concerns an improvement to a liquid waste processing apparatus for separating an recovering floating sludge such as paint dust that is contained in liquid wastes discharged from a coating booth or the like.

2. Description of the Prior Art

Since liquid wastes discharged from a coating booth contain chemicals such as so-called killer agents used for separating paints from water, a great amount of floating sludge such as paint dust is caused to float on the liquid surface of a liquid waste processing pool into which the liquid wastes are discharged.

For separating and recovering the floating sludges from the liquid wastes, a movable float has been used, which is caused to float on the liquid surface of a liquid waste processing pool, so that the floating sludges on the liquid wastes are sucked up by a vacuum suction pipe attached to the float and sent to a filtration device for recovery (refer, for example, to Japanese Patent Unexamined Publication No. Sho 63-162093 and Japanese Utility Model Unexamined Publication No. Sho 62-56173).

However, it has been difficult for the float to run after the floating sludges scattered over the entire area of the liquid surface in the liquid waste processing pool and completely suck them up using the vacuum suction pipe in addition, the mechanism used for moving the float and the control therefor are very complicated increasing the installation cost, as well as the filtration device often causes failure due to the viscosity of the floating sludges, to remarkably increase the installation cost and the operation cost.

In view of the above, the present applicant has previously proposed a liquid waste processing apparatus capable of automatically collecting floating sludges that are contained in the liquid wastes discharged from a coating booth to a localized portion and recoverying them by a simple mechanism (Japanese Utility Model Application No. Sho 63-40338).

In this proposed apparatus, a liquid waste processing vessel has an inlet disposed on one side wall into which liquid wastes fall from above and from which the liquid wastes leave with bubbles entrained therein, an exit disposed on the other opposite side wall, and an inclined plate disposed above the exit against which the flow of the liquid wastes is abutted and then turned toward the exit again.

In this apparatus, the floating sludges contained in the liquid wastes are adsorbed to the bubbles involved in the flow of the wastes and transported along with a surface stream from the inlet to the exit. When the flow of the liquid wastes reaches the inclined plate, it abuts against the plate and turns its direction toward the inlet while leaving the floating sludges as they are at a localized area above the inclined plate Then, the sludges completely separated from the liquid wastes are discharged out of the processing vessel and treated in a filtration tank. Meanwhile, the liquid wastes removed with the sludges flow along the downwardly sloped inclined plate and then are discharged from the exit for recyclical use.

Thus, the floating sludges can be separated from the liquid wastes easily in a simple structure with no substantial moving components.

However, even in this proposed apparatus, a portion of the floating sludges may sometime stagnate on the liquid surface in the inlet or along the lower surface of the inclined plate. Further, precipitating sludges contained in the liquid wastes ma be deposited at the bottom of the liquid waste processing vessel, to necessitate frequent cleaning operation for the vessel.

SUMMARY OF THE INVENTION

It is, accordingly, an object of the present invention to provide a liquid waste processing apparatus capable of preventing the stagnation, deposition, accumulation, etc. of the sludges in a liquid waste processing vessel and also reducing the frequency of cleaning maintenance to the liquid waste processing vessel.

The foregoing object can be attained in accordance with the present invention by a liquid wastes processing apparatus having a liquid waste processing vessel for separating and recoverying floating sludges from liquid wastes, wherein the liquid waste processing vessel comprises:

an inlet disposed on one side wall of the processing vessel for receiving liquid wastes fallen from above the processing vessel at a portion just beneath the liquid surface and turning them toward the other opposite side wall of the processing vessel;

an exit disposed on the side of the other opposite side wall of the processing vessel and opened at a portion below the liquid surface, the other opposite side wall being slanted downwardly toward the one side wall, and an inclined plate disposed above the exit on the side of the other opposite side wall to define a shallow portion below the liquid surface, in which the inclined plate is extended along the inclination of the other opposite side wall toward the on side wall to define a narrow flow channel between the inclined plate and the other opposite side wall, which is in communication from the bottom to the exit of the liquid wastes processing vessel, and in which the cross sectional area of the narrow flow channel is made smaller than that of the opening formed between the downmost end of the inclined plate and the one side wall.

According to the present invention, when liquid wastes are caused to fall from above the liquid waste processing vessel into the inlet disposed on its one side wall, they involve surrounding air to generate a great amount of air bubbles due to intense impact shock upon falling, such shock being exerted at a portion just beneath the liquid surface in the processing vessel, and they the liquid wastes form a surface stream accompanying such bubbles from the one side wall and to the other opposite side wall of the processing vessel.

Thus, floating sludges such as paint dust contained in the liquid wastes are adsorbed on the bubbles, caused to flow upwardly to the liquid surface and then transported toward the other opposite side wall of the processing vessel while being carried on the surface stream. Therefor, neither do the floating sludges stagnate on the liquid surface nor are the precipitating are are deposited at the bottom of the inlet.

Then, the surface stream abuts against the inclined plate extended slantwise from the other opposite side wall and then turns its direction toward one side wall of the processing vessel.

In this case, the floating sludges at the liquid surface are gathered to the shallow portion above the inclined plate under the effect of the surface stream flowing toward the other opposite side wall where they are completely separated from the surface stream when the latter abuts against the inclined plate and turns back toward the one side wall.

Since the floating sludges are concentrated to a localized portion, the operation for separating and recovering the floating sludges can be facilitated.

Then, the flow of the liquid wastes, which has abutted against the inclined plate and turned toward the one side wall of the processing vessel, is caused to flow downwardly, passed through the opening formed between the downmost end of the inclined plate and the one side wall of the processing vessel, sucked out at the bottom of the processing vessel into a narrow flow channel formed between the lower surface of the inclined plate and the other opposite side wall of the processing vessel and then discharged out of the exit under sucking action.

In this case, since the cross-sectional area of the narrow flow channel in communication with the exit is designed to be smaller than the opening area formed between the lowermost end of the inclined plate and the one side wall of the processing vessel, the flow of the liquid wastes is accelerated and the liquid wastes are vigorously sucked from the bottom of the processing vessel into the inside of the narrow flow channel.

In addition, since the other opposite side wall is slanted downwardly toward the one side wall in the liquid processing vessel, the horizontal area at the bottom of the vessel is narrowed and, accordingly, precipitating sludges contained, if any, in the liquid wastes are not deposited at the bottom of the liquid waste processing vessel, but are sucked together with the liquid wastes into the narrow flow channel and then discharged out of the exit.

Furthermore, since the flow rate is high in the narrow flow channel as mentioned above, the floating sludges, if any, sucked together with the liquid wastes into the inside of the narrow flow channel neither stagnate nor deposit onto the lower surface of the inclined plate.

Accordingly, it is possible to prevent the stagnation or deposition of the floating sludges or the accumulation of the precipitating sludges in the processing vessel, thereby enabling one to reduce the frequency for performing cleaning maintenance on the liquid waste processing vessel.

DESCRIPTION OF THE ACCOMPANYING DRAWINGS

These and other objects, as well as advantageous features of the present invention will become more apparent by reading the following description of the preferred embodiment according to the present invention in conjunction with the accompanying drawings, wherein:

FIG. 1 is a front elevational view in cross-section of a preferred embodiment for the liquid waste processing apparatus according to the present invention and, FIG. 2 is a front elevational view in cross-section of the apparatus proposed previously by the present applicant, which is cited here as a base for the present invention.

DESCRIPTION OF THE PREFERRED EMBODIMENT

Figure 1:
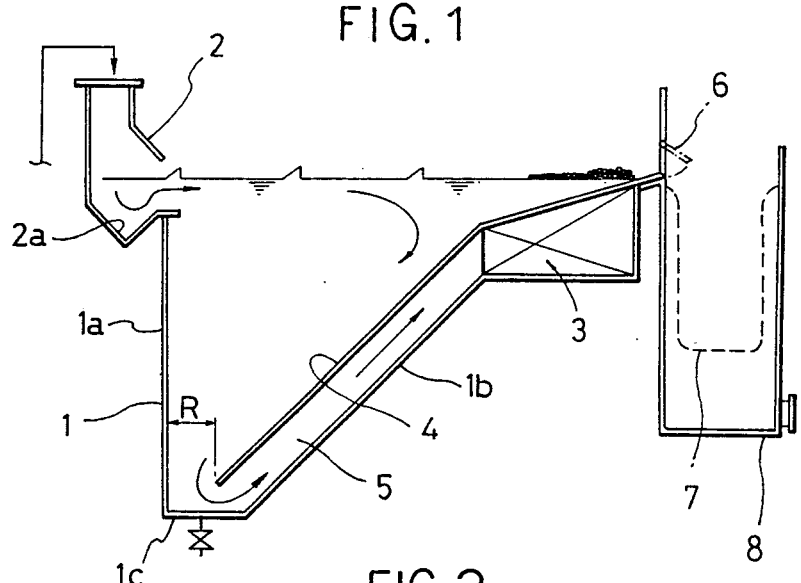

The present invention is to be described more specifically referring to the drawings.

Prior to the detailed explanation for the present invention, a liquid waste processing apparatus proposed previously by the present applicant (Japanese Utility Model Application No. Sho 63-40338) is to be explained briefly at first, for reference.

Figure 2:
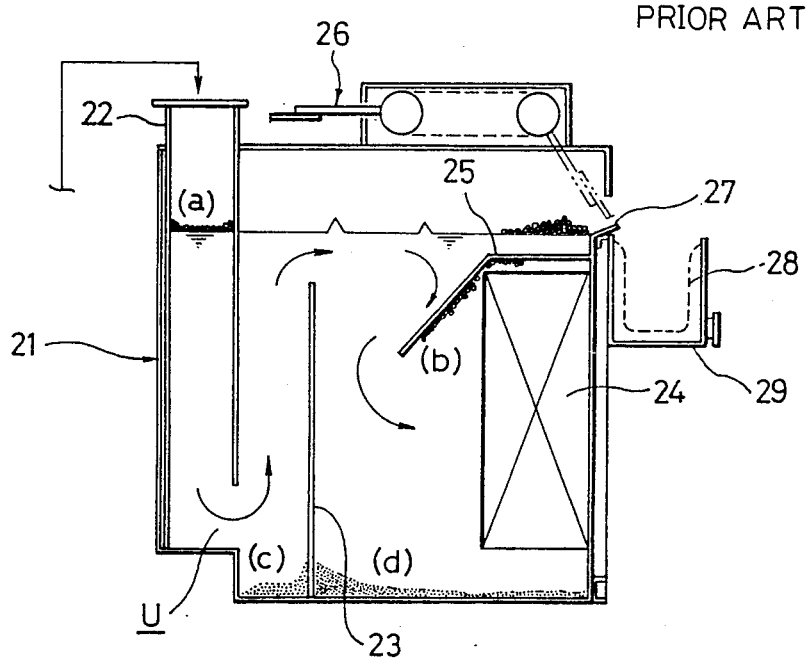

FIG. 2 is a front elevational view of the previously proposed apparatus, in which a liquid waste processing vessel 21 has an inlet 22 disposed vertically on one side wall thereof and extended to the bottom of the vessel 21, into which liquid wastes containing floating sludges such as paint dusts fall from above, and a partition wall 23 extended vertically from the bottom of the vessel 21 to beneath of the liquid surface, being spaced apart by a predetermined gap from the inner wall of the inlet 22. They define a flow channel U for turning the directing of the liquid wastes fallen from above the processing vessel 21 to the bottom thereof and then upwarded toward the liquid surface along a U-shaped path.

On the other opposite side wall, the liquid waste processing vessel 21 has an exit 24 which opens below the liquid surface, and an inclined plate 25 extended slantwise from the top end of the other opposite side wall downwardly toward the partition wall 23 for forming a shallow portion above the exit 24. A scraper conveyor 26 is disposed above the inclined plate 25 for scraping out the floating sludges on the liquid surface, and a sludge tank 29 having a strainer 28 is disposed below the scraping port 27.

In the liquid waste processing apparatus having such a construction, liquid wastes containing paint dust, etc. fall vigorously from above the liquid waste processing vessel 21 into the inlet 22, involve surrounding air to generate a great amount of bubbles and then turn upwardly from the bottom of the processing vessel 21 along the U-shaped path through the flow channel U formed between the inlet 22 and the partition wall 23, while entraining the bubbles thus generated. Since the paint dust contained in the liquid wastes is made separatable easily from water by means of killer agents and readily adsorbed to the bubbles, such dust is adsorbed to the bubbles that vigorously rise toward the liquid surface and carried on the stream of the liquid wastes turning upwardly from the bottom to the liquid surface in the inlet 22.

Then, the flow of the liquid wastes uprising to the liquid surface turns its direction being sucked toward the exit 24, abuts against the inclined surface of the inclined plate 25 disposed above the exit 24, creates a flow that turns back toward the partition wall 23 along the inclination of the plate 25 and, when the flow reaches the lower end of the inclined plate 25, forms a stream directing from the partition wall 23 to the exit 24.

In this case, the floating sludges going out of the flow channel U are transported by the flow of the liquid wastes directing to the inclined plate 25 and concentrated in a localized area near the other opposite side wall of the liquid waste processing vessel 21 above the inclined plate 25. The liquid wastes abutting against the inclined plate 25 turn back their direction toward the partition wall 23 while separating leaving the concentrated sludges as they are at the localized area.

Then, the gathered floating sludges are discharged by means of the scraper conveyor 26 through the scraping port 27 to the sludge tank 29, where the solid matters is separated from the water contents by the strainer 28.

In this way, the liquid wastes, from which the floating sludges, etc. have been separated and removed, are recycled again from the exit 24 to the coating booth, etc. for reuse.

Accordingly, the operation for separating and recovering the floating sludges can be facilitated and the structure of the apparatus is made extremely simple.

However, the prior apparatus having the construction shown in FIG. 2 still involve the following problems to be solved. The floating sludges that can not go out of the flow channel U, if any, may sometimes float upwardly and stagnate on the liquid surface in the inlet 22 as shown at (a), a portion of the floating sludges going out of the flow channel U may possibly go around to the rearface of the inclined plate 25 to deposit and stagnate there as shown at (b), as well as precipitating sludges contained together with the floating sludges in the liquid wastes may deposit at the bottom of the liquid waste processing vessel 21 as shown at (c) and (d). Such sludges gradually harden to cause a difficulty in their disposal and they increase the frequency of the need to perform cleaning maintenance to the processing vessel 21.

STRUCTURE OF THE PREFERRED EMBODIMENT

The present invention has been accomplished for overcoming such disadvantages found in our previously proposed apparatus and a preferred embodiment of the liquid waste processing apparatus of the present invention is to be described specifically referring to FIG. 1, which is a front elevational cross-sectional view thereof.

In this embodiment, the liquid waste processing apparatus comprises a liquid waste processing vessel 1 having an inlet 2 disposed on one side wall 1a thereof for receiving liquid wastes vigorously falling from above the processing vessel 1 at a portion just beneath the liquid surface and turning the flow direction of the liquid wastes toward the other opposing side of the vessel 1.

The inlet 2 has a receiving bottom 2a formed into a V-shaped configuration for receiving the liquid wastes such that the liquid wastes falling from above are caused to collide against the bottom 2a and splash inwardly upon collision to hit each other at the valley of the V-shape bottom 2a, thereby generating and involving a great amount of bubbles upon impact shock.

On the other side of the processing vessel 1, an exit 3 is disposed at the other opposite side wall 1b of the processing vessel 1 that opens below the liquid surface, and the other opposite side wall 1b is downwardly inclined toward the one side wall 1a so that the width of the horizontal bottom 1c of the processing vessel 1 formed between both of the side walls 1a and 1b is made narrow.

An inclined plate (sometime referred to also as a beach plate) 4 is disposed above the exit 3 for forming a ford or shallow portion below the liquid surface and near the other opposite side wall 1b. The beach plate 4 is extended slantwise along the downward inclination of the other opposite side wall 1b toward the one side wall 1a, such that a narrow flow channel 5 in communication from the bottom 1c to the exit 4 of the processing vessel 1 is formed between the lower surface of the beach plate 4 and the other opposite side wall 1b. The cross sectional area of the narrow flow channel 5 is defined smaller than the opening area for the opening R defined between the lowermost end of the beach plate 4 and the one side wall 1a.

Furthermore, an openable dam plate 6 is disposed to the other opposite side wall above the liquid surface of the liquid processing vessel 1 for discharging the floating sludges concentrated to the shallow portion above the beach plate 4 together with a portion of the liquid wastes to the outside of the processing vessel 1. A sludge tank 8 having a strainer is disposed below the dam plate 6 into which the liquid wastes discharged together with the floating sludges fall and recovered.

OPERATION OF THE PREFERRED EMBODIMENT

In the liquid waste processing vessel 1 of this embodiment having thus been constituted, the liquid wastes vigorously fall from above into the inlet 2 disposed on one side wall 1a of the processing vessel 1, caused to collide against the receiving bottom 2a disposed just beneath the liquid surface in the processing vessel 1 and involve surrounding air due to the impact shock caused by collision, thereby generating and involving a great amount of bubbles.

Then, the liquid wastes entraining the bubbles thus generated are turned toward the other opposite side wall 1b of the processing vessel 1 while forming a surface stream that flows from on one side wall 1a to the other opposite side wall 1b.

In this instance, floating sludges contained in the liquid wastes falling into the inlet 2 are adsorbed on the bubbles and float together with the bubbles upwardly to the liquid surface and transported toward the beach plate 4, while being carried on the surface stream that flows from the inlet 2 to the other opposite side wall 1b. Accordingly, there is no worry that the floating sludges will stagnate on the liquid surface or the precipitating sludges are will deposit on the receiving bottom 2a in the inlet 2.

Then, the floating sludges are gathered to the shallow portion formed above the beach plate 4 by the effect of the flow of the surface stream When the flow of the surface stream abuts against the inclined surface of the beach plate 4 and turns its direction toward the one side wall 1a, the sludges are separated from the stream and remain as they are in the concentrated state at a localized area near the other opposite side wall 1b.

The thus gathered floating sludges fall together with a portion of the liquid wastes to the inside of the sludge tank 8 and then are separated and recovered from the liquid wastes by means of the strainer 7, Meanwhile, the flow of the liquid wastes abutted against the beach plate 4 and turned in its direction to the one side wall 1a is caused to flow downwardly, sucked toward the exit 3, passed through the opening R defined between the downward end of the beach plate 4 and the one side wall 1a and then entered vigorously into the inside of the narrow flow channel 5 formed between the lower surface of the beach plate 4 and the other opposite side wall 1b. In other words, the flow of the liquid wastes passing through the opening R is sucked into the narrow flow channel 5 at an increased speed and then flows vigorously through the narrow flow channel 5 from the bottom 1c to the exit 3 of the processing vessel 1.

Since the other opposite side wall 1b is slanted downwardly toward the one side wall 1a to make the area of the horizontal bottom 1c much smaller, precipitating sludges in the liquid waste do not deposit at the horizontal bottom 1c.

Furthermore, since the flow rate is high in the narrow flow channel 5, floating sludges, if sucked into the inside of the narrow flow channel 5, neither stagnate nor deposit to the rear side of the beach plate 4.

As has been described above, according to the present invention, since the floating sludges contained in the liquid wastes fallen into the liquid wastes processing vessel 1 can effectively be separated from the liquid wastes and concentrated to a certain localized portion, it can provide a excellent effect of facilitating the operation for the recovery of the sludges.

In addition, since the construction of the apparatus is extremely simple, the installation cost for the entire apparatus can be reduced extremely.

Further, since the floating sludges contained in the liquid wastes can be removed effectively, this can reduce the frequency for the occurrence of failures in the waste-cleaning filtration device and can greatly reduce the running cost therefor.

Furthermore, since it is possible to prevent the stagnation or deposition of the floating sludges or precipitating sludges contained in the liquid wastes at specified portions in the liquid waste processing vessel, or accumulation thereof at the bottom of the processing vessel, the operation frequency for the cleaning maintenance to the inside of the liquid waste processing vessel can be remarkably decreased, to thereby significantly reduce the cleaning cost.

What is claimed is:

1. A liquid waste processing apparatus having a liquid waste processing vessel for separating and recovering floating sludges from liquid wastes, wherein the liquid waste processing vessel comprises:

an inlet disposed on one side wall of said processing vessel for receiving liquid wastes falling from above said processing vessel at a portion just beneath the liquid surface and turning them toward the other opposite side wall of the processing vessel;

an exit disposed on the side of the other opposite side wall of said processing vessel and opening at a location below said liquid surface, the other opposite side wall being slanted downwardly toward said one side wall, an inclined plate disposed above said exit on the side of said opposite side wall, to define a shallow portion below said liquid surface, said inclined being extended along the inclination of said other opposite side wall toward said one side wall to define a narrow flow channel between said inclined plate and said other opposite side wall, which is in communication from the bottom to the exit of said liquid waste processing vessel, and the cross-sectional area of said narrow flow channel being smaller than that of the opening formed between the lowermost end of said inclined plate and said one side wall.

* * * * *